(12) United States Patent
Newman et al.

(10) Patent No.: US 9,500,165 B2
(45) Date of Patent: Nov. 22, 2016

(54) SEALING CAP USING O-RING FOR VEHICLE INTAKE MANIFOLD

(71) Applicant: Ford Global Technologies, LLC, Dearborn, MI (US)

(72) Inventors: Christopher William Newman, Farmington Hills, MI (US); Katherine Jane Randall, Dearborn, MI (US); David Born, Commence Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 7 days.

(21) Appl. No.: 13/932,204

(22) Filed: Jul. 1, 2013

(65) Prior Publication Data
US 2015/0000625 A1    Jan. 1, 2015

(51) Int. Cl.
| | |
|---|---|
| *F02M 35/10* | (2006.01) |
| *F02M 35/104* | (2006.01) |
| *F16B 33/00* | (2006.01) |
| *F16B 37/14* | (2006.01) |
| F02M 35/112 | (2006.01) |
| F16B 21/02 | (2006.01) |

(52) U.S. Cl.
CPC .......... *F02M 35/104* (2013.01); *F16B 33/004* (2013.01); *F16B 37/14* (2013.01); *F02M 35/10091* (2013.01); *F02M 35/10144* (2013.01); *F02M 35/10347* (2013.01); *F02M 35/112* (2013.01); *F05C 2225/08* (2013.01); *F16B 21/02* (2013.01)

(58) Field of Classification Search
CPC ................. F02M 35/10321; F02M 35/10144; F02M 35/112; F02M 35/10347; F05C 2225/08
USPC ..................................................... 123/184.21
See application file for complete search history.

(56) References Cited

U.S. PATENT DOCUMENTS

| | | | | |
|---|---|---|---|---|
| 3,548,704 | A  * | 12/1970 | Kutryk | ........................... 411/373 |
| 6,789,691 | B2 | 9/2004 | Martin et al. | |
| 8,046,974 | B2 | 11/2011 | Lewis | |
| 2007/0144483 | A1* | 6/2007 | Torii | ....................... F02D 9/103 123/337 |
| 2010/0152785 | A1* | 6/2010 | Forton | ............... A61B 17/8605 606/301 |

* cited by examiner

*Primary Examiner* — Lindsay Low
*Assistant Examiner* — Charles Brauch
(74) *Attorney, Agent, or Firm* — LeClairRyan

(57) ABSTRACT

A locking sealing arrangement for providing a fluid tight seal between a cap or a spigot and an adjacent structure is set forth. The locking sealing cap includes a peripheral sealing member such as an o-ring to form the fluid tight seal. The locking sealing cap engages the inner surface of the adjacent support structure by a cam-lock arrangement. A locking tab extends from the surface of the support structure. A tab-receiving slot is formed in the locking sealing cap. Once the locking tab is aligned in the tab-receiving slot, rotational movement of the locking sealing cap causes engagement of the locking sealing cap with the support structure. One embodiment of the locking sealing cap includes an internal torque feature for receiving a tool to allow engagement. In another embodiment of the locking sealing cap an external, multi-sided tool engagement surface is provided.

19 Claims, 3 Drawing Sheets

SEALING CAP USING O-RING FOR VEHICLE INTAKE MANIFOLD

TECHNICAL FIELD

The disclosed inventive concept relates generally to intake manifolds for internal combustion engines. More particularly, the disclosed inventive concept relates to a locking, sealing arrangement for a cap or spigot for an intake manifold.

BACKGROUND OF THE INVENTION

Components formed from thermoplastic are frequently joined by spin welding or friction welding in which the interfaces of the two components are brought together under pressure. While one component is held stationary the other component is rotated against the stationary part at a high rate of speed creating frictional heat causing the thermoplastic at the interfaces to melt and fuse together. A strong, hermetic seal results from the spin weld.

It is common for the modern intake manifold for an internal combustion engine to utilize spin welded caps and spigots. A spin-welded cap may be effectively employed in a variety of manifold applications, such as for a sealing arrangement for an internal bracing or post arrangement in an intake manifold having two halves held together by a fastener. To provide a fluid-tight seal, a spin welded cap may be provided over the head of the fastener.

Spin welding is often useful where the caps and spigots sometimes cannot be directly molded into the part due to restrictions related to tooling or part interchangeability. However, spin welding, while providing a desirable seal and a strong bond, has space and structure limitations. It is relatively expensive to undertake from both labor and tooling perspectives.

Thus the use of spin welded caps and spigots, while providing an attractive alternative to other methods of fastening and sealing, represents an expensive and tooling- and cycle time-intensive approach. Accordingly, a system for providing a cap that also serves a sealing function for use with the intake manifold of a vehicle that is easy to install, requires minimal tooling, and provides an effective seal remains wanting.

SUMMARY OF THE INVENTION

The disclosed inventive concept overcomes the problems associated with known locking and sealing arrangements. Particularly, a sealing arrangement for caps and spigots used in a variety of applications, such as in relation to vehicle intake manifolds, is disclosed.

A peripheral sealing member is provided on the locking sealing cap. The peripheral sealing member is provided in a groove formed on the peripheral wall of the locking sealing cap. The peripheral sealing member is preferably but not necessarily an o-ring. The o-ring forms a fluid tight, hermetic seal between the locking sealing cap and the inner surface of the adjacent support structure.

The locking sealing cap of the disclosed inventive concept engages the inner surface of the adjacent support structure by a cam-lock arrangement. A locking tab extends from the surface of the support structure. A tab-receiving slot is formed in the locking sealing cap. Once the locking tab is aligned in the tab-receiving slot, rotational movement of the locking sealing cap causes engagement of the locking sealing cap with the support structure.

In one embodiment of the locking sealing cap an internal torque feature is provided for receiving a tool such as an Allen wrench to allow engagement. In another embodiment of the locking sealing cap an external, multi-sided tool engagement surface is provided. Both embodiments rely on a cam-lock arrangement to lock the locking sealing cap to the support structure.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations.

Figure 1:
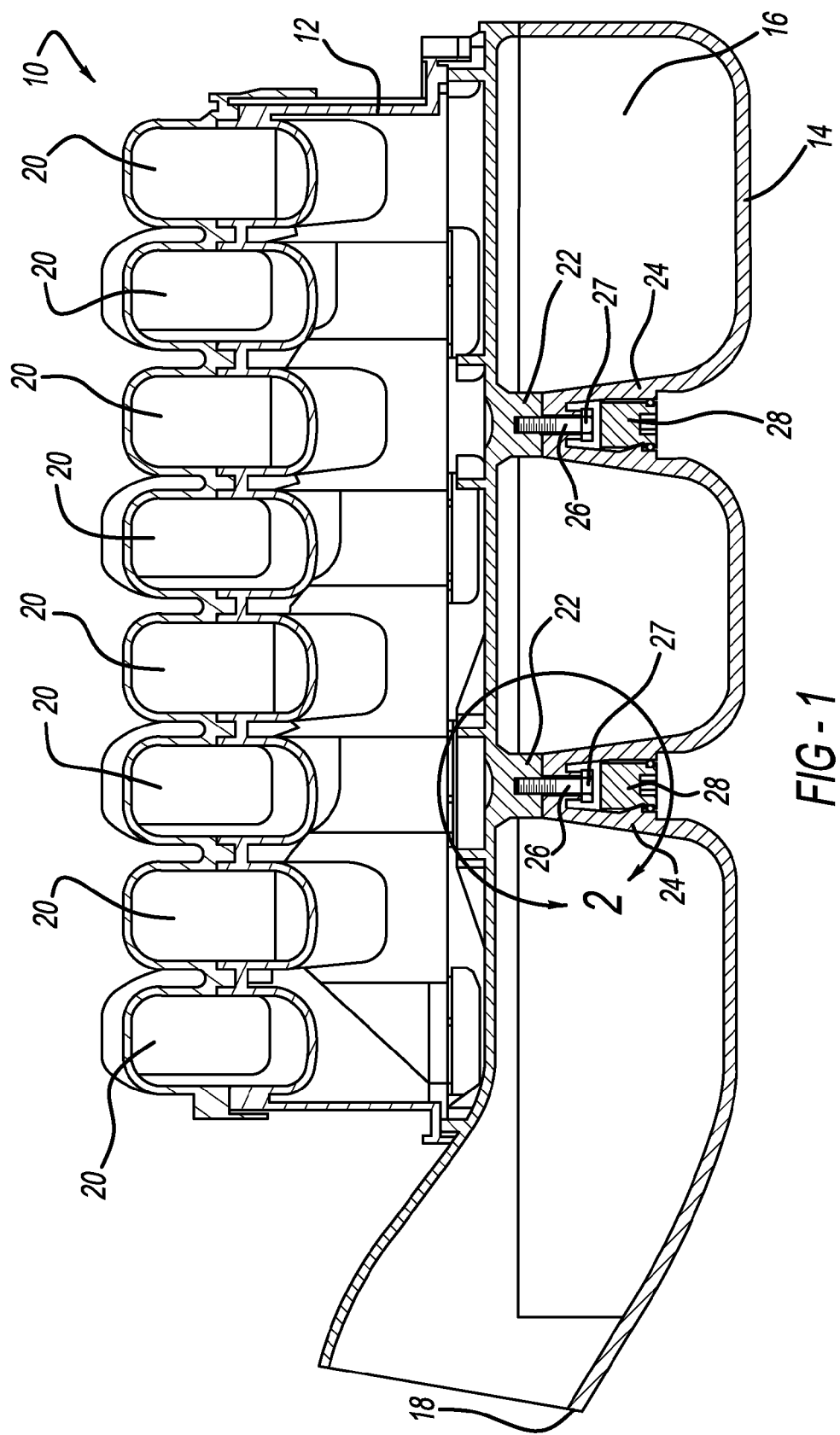
FIG. 1 is a cross-sectional view of an intake manifold having locking sealing caps according to the disclosed inventive concept.

FIG. 1 illustrates a cross-sectional view of locking sealing caps according to the disclosed inventive concept shown in conjunction with an intake manifold, generally illustrated as 10. It is to be understood that the locking sealing caps according to the disclosed inventive concept may find use in a broad variety of applications both in conjunction with intake manifolds and in virtually any other application where a sealing solution relative to a fastener is needed. Accordingly, the application of the locking sealing caps of the disclosed inventive concept shown in FIG. 1 is only suggestive and is not intended as being limiting.

The intake manifold 10 includes an upper shell portion 12 and a lower shell portion 14. It is to be understood that reference to "upper" and "lower" when describing the shell portions 12 and 14 is only made for the sake of convenience and is not intended as being limiting. Specifically, while conventionally intake manifolds in today's vehicles are generally positioned horizontally above the engine it is conceivable that the intake manifold according to the disclosed inventive concept may alternatively be vertically positioned to the side of the engine.

A cavity 16 is formed between the upper shell portion 12 and the lower shell portion 14. The intake manifold 10 also includes a throttle body mounting flange 18. A plurality of intake runners 20 are formed as part of the upper shell portion 12. It is to be understood that the overall configuration of the intake manifold as set forth in FIG. 1 is suggestive and is not intended as being limiting as other configurations may be possible without deviating from the spirit and scope of the disclosed inventive concept.

The upper shell portion 12 has two upper posts 22 extending downwardly. The lower the portion 14 has two lower posts 24 extending upwardly. The upper shell portion 12 and the lower shell portion 14 are coupled together by mechanical fasteners such as thread forming bolts 26. Each of the thread forming bolts 26 includes a bolt head 27. The number and placement of the posts 22 and 24 and the thread forming bolts 26 are shown in FIG. 1 for illustrative purposes and are not intended as being limiting.

According to the disclosed inventive concept a locking sealing cap is provided generally over the bolt head 27 to provide a hermetic seal. The two embodiments of the locking sealing cap of the disclosed inventive concept are illustrated in close-up view in FIGS. 2 and 3.

Figure 2:
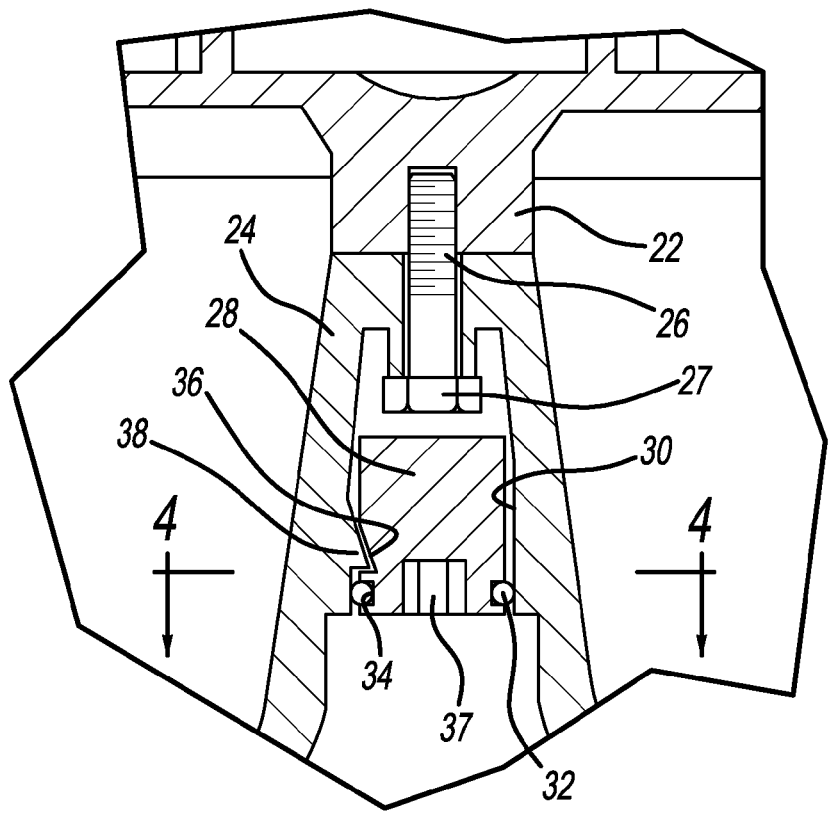
FIG. 2 illustrates a close-up sectional view of the locking sealing cap taken along circle 2 of FIG. 1 according to a first embodiment of the disclosed inventive concept.

With reference to FIG. 2, a locking sealing cap 28 is shown fitted within a cavity 30 centrally formed in the lower post 24. The locking sealing cap 28 includes a sealing member in the form of a sealing member or o-ring 32 provided in a peripheral groove 34 formed on the outer wall of the locking sealing cap 28. The sealing member or o-ring 32 is preferably made from a fuel- and oil-resistant elastomeric material. A tab-receiving slot 36 is also formed in the outer wall of the locking sealing cap 28. Two or more tab-receiving slots (not shown) may be included. An internal torque feature 37 for receiving a tool such as an Allen wrench is formed at the end of the locking sealing cap 28.

The centrally formed cavity 30 of the lower post 24 includes a locking tab 38 extending therefrom. Two or more locking tabs (not shown) may be included. The locking tab 38 can engage the tab-receiving slot 36 of the locking sealing cap 28 as will be discussed with respect to FIGS. 4 and 5.

Figure 3:
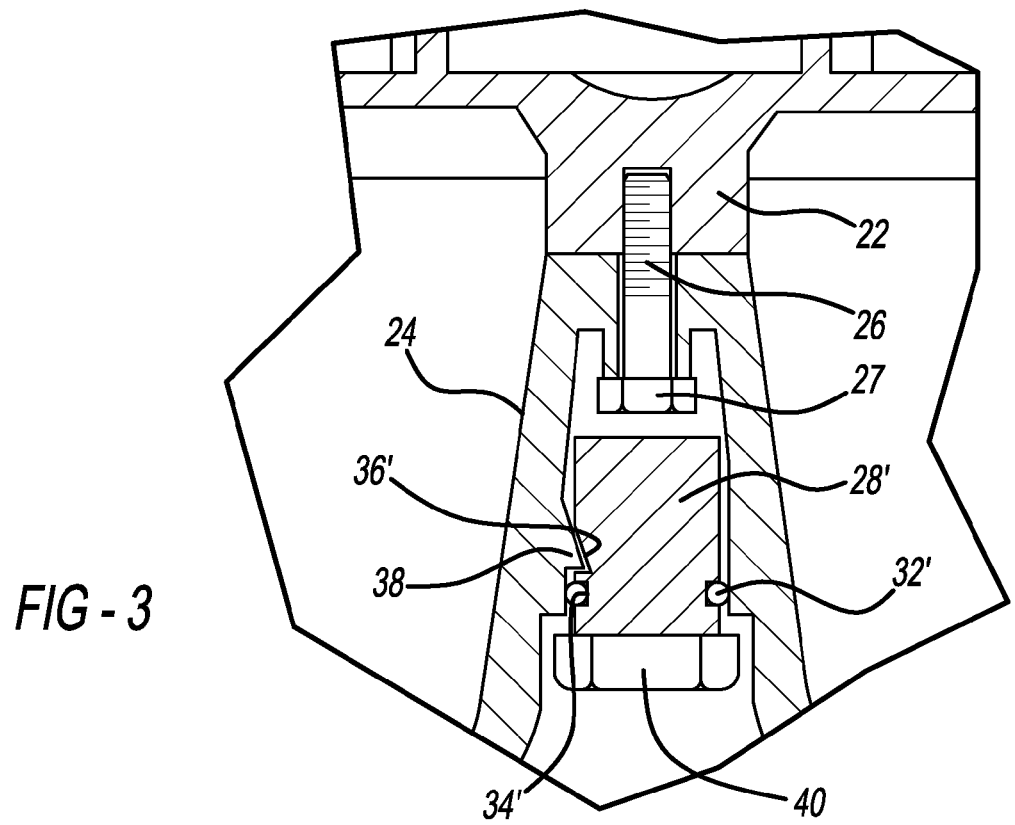
FIG. 3 illustrates a close-up sectional view of a locking sealing cap according to a second embodiment of the disclosed inventive concept.

A second embodiment of the locking tab of the disclosed inventive concept is shown in FIG. 3. In this figure a locking tab 28' is shown fitted within the centrally formed cavity 30. The locking sealing cap 28' includes a sealing member in the form of an o-ring 32' provided in a peripheral groove 34' formed on the outer wall of the locking sealing cap 28'. A tab-receiving slot 36' is also formed in the outer wall of the locking sealing cap 28'. As noted above with respect to the locking sealing cap 28 of the first embodiment of the disclosed inventive concept two or more tab-receiving slots (not shown) may formed in the outer wall of the locking sealing cap 28'.

While the first embodiment of the locking sealing cap of the disclosed concept, the locking sealing cap 28, includes an internal torque feature, the second embodiment of the locking sealing cap shown in FIG. 3, the locking sealing cap 28', includes an external, multi-sided tool engagement surface 40, such as a hex head configuration.

Regardless of the embodiment of the locking sealing cap of the disclosed inventive concept both the locking sealing cap 28 and the locking sealing cap 28' lockingly engage the centrally formed cavity 30 in the same manner using a cam-lock method of attachment. However, only the engagement of the locking sealing cap 28 will be discussed.

Figure 4:
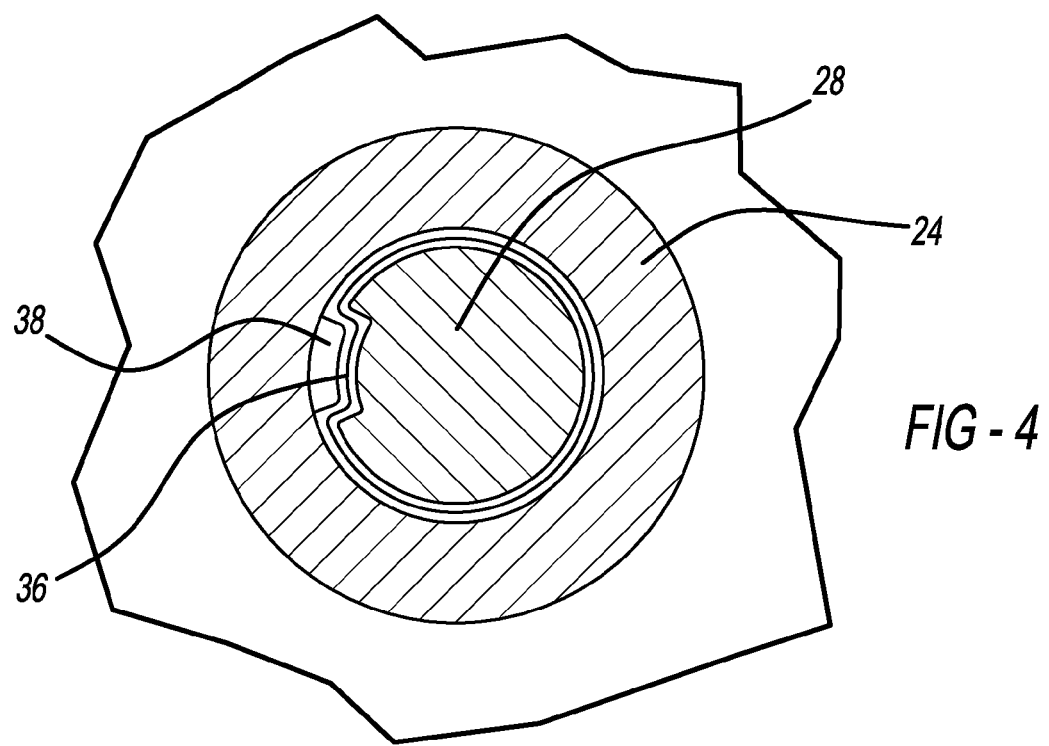
FIG. 4 illustrates a view taken along line 4-4 of FIG. 2 showing the locking sealing cap of the disclosed concept in its unlocked position relative to the adjacent support structure.

With respect to FIG. 4, the locking sealing cap 28 is shown in its unlocked position relative to the centrally formed cavity 30. As may be seen the locking tab 38 extending from the centrally formed cavity 30 is shown essentially aligned within the space defined by the tab-receiving slot 36. In this unlocked position the locking sealing cap 28 may be readily removed from the centrally formed cavity 30.

Figure 5:
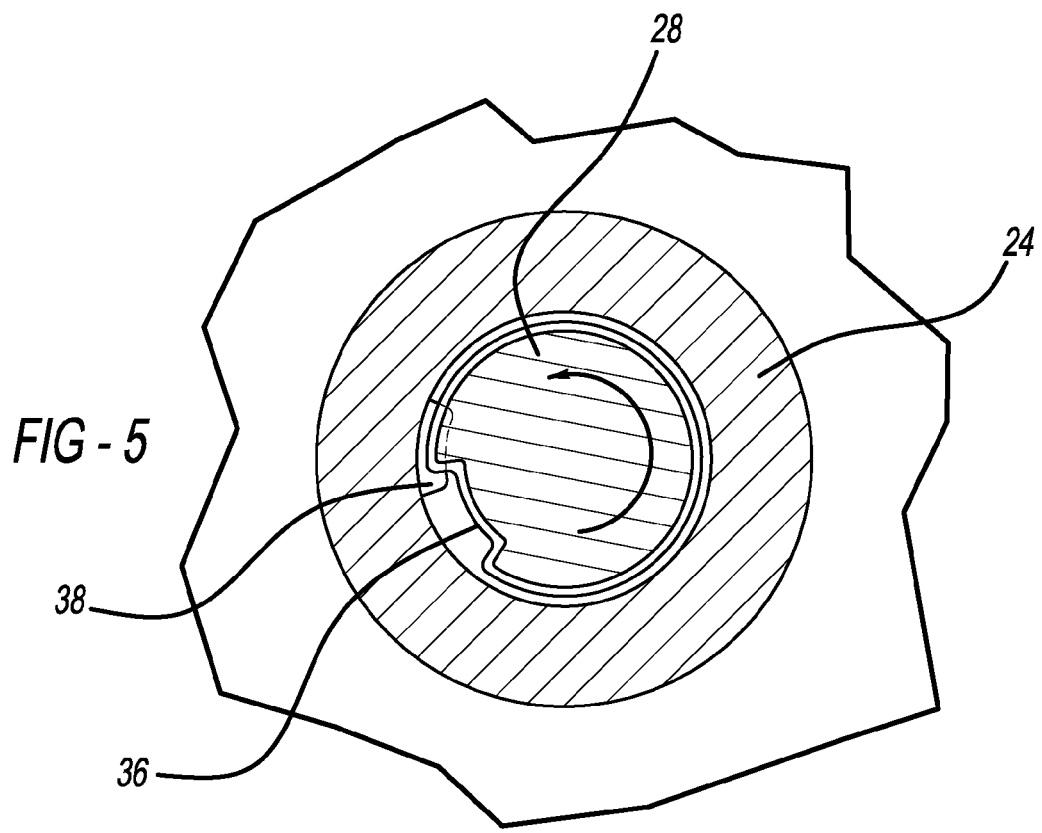
FIG. 5 illustrates a view similar to that of FIG. 4, but shows the locking sealing cap of the disclosed concept in its locked position relative to the adjacent support structure.

Once the locking tab 38 of the centrally formed cavity 30 is aligned with the tab-receiving slot 36 of the locking sealing cap 28, engagement of the locking sealing cap 28 with the centrally formed cavity 30 occurs by rotating the locking sealing cap 28 relative to the centrally formed cavity 30 as illustrated in FIG. 5. By rotating the locking sealing cap 28 in this manner, the locking sealing cap 28 is locked in place by the locking tab 38 of the centrally formed cavity 30. Such an attachment is commonly referred to in the art as a cam-lock assembly. The locking sealing cap 28 may be removed from the centrally formed cavity 30 by simply reversing the direction of the rotating step described above.

Upon lockingly engaging the locking tab 38 with the tab-receiving slot 36, the o-ring 32 is positioned in sealing engagement between the locking sealing cap 28 and the centrally formed cavity 30.

The disclosed invention as set forth above overcomes the challenges faced by arrangements for sealing one component relative to another. However, one skilled in the art will readily recognize from such discussion, and from the accompanying drawings and claims that various changes, modifications and variations can be made therein without departing from the true spirit and fair scope of the invention as defined by the following claims.

What is claimed is:

1. An intake manifold assembly for an internal combustion engine comprising:
   a first shell;
   a second shell separate from said first shell;
   a first post portion extending from said first shell, said first post portion having an abutment end;
   a second post portion extending from said second shell, said second post portion having a cavity, said second post portion having an abutment end for abutment against said abutment end of said first post portion;
   a fastener for affixing said shells together; and
   a rotatably lockable sealing cap having a peripheral sealing member, a portion of said cap being fitted within said cavity, said cap being spaced apart and separate from said fastener.

2. The intake manifold assembly for an internal combustion engine of claim 1 wherein said fastener is a thread forming fastener.

3. The intake manifold assembly for an internal combustion engine of claim 1 wherein said fastener has a fastener head and wherein said fastener head is positioned in said cavity.

4. The intake manifold assembly for an internal combustion engine of claim 1 wherein said cavity includes a wall and wherein a locking tab extends from said wall.

5. The intake manifold assembly for an internal combustion engine of claim 4 wherein said locking sealing cap includes a tab-receiving slot.

6. The intake manifold assembly for an internal combustion engine of claim 1 wherein said locking sealing cap has a tool manipulating end and wherein said tool manipulating end includes an internal torque feature formed therein.

7. The intake manifold assembly for an internal combustion engine of claim 1 wherein said locking sealing cap has a tool manipulating end and wherein said tool manipulating end includes an external, multi-sided tool engagement surface.

8. A post arrangement for an intake manifold, the arrangement comprising:
- a first shell having a first post portion extending therefrom;
- a second shell having a second post portion extending therefrom, said shells being separate from one another, said posts having abutment ends for abutment against one another;
- a cavity formed in one of said portions;
- a fastener affixing said portions together; and
- a rotatably lockable sealing cap having a sealing member, at least a portion of said cap being fitted within said cavity, said cap being spaced apart and separate from said fastener.

9. The post arrangement for an intake manifold of claim 8 wherein said locking sealing cap includes a peripheral groove and wherein said sealing member is provided substantially within said groove.

10. The post arrangement for an intake manifold of claim 8 wherein said post portions have fastener holes formed therein, wherein said fastener includes a fastener head and wherein at least a portion of said cap is fitted over said fastener head.

11. The post arrangement for an intake manifold of claim 8 wherein said cavity includes a wall and wherein a locking tab extends from said wall.

12. The post arrangement for an intake manifold of claim 11 wherein said locking sealing cap includes a tab-receiving slot.

13. The post arrangement for an intake manifold of claim 8 wherein said locking sealing cap has a tool manipulating end and wherein said tool manipulating end includes an internal torque feature formed therein.

14. The post arrangement for an intake manifold of claim 8 wherein said locking sealing cap has a tool manipulating end and wherein said tool manipulating end includes an external, multi-sided tool engagement surface.

15. A sealing arrangement for a post for an intake manifold, the post including separate first and second portions held together by a fastener, the arrangement comprising:
- a cavity defined in one of the separate portions, the portion having a fastener-passing hole;
- a fastener-receiving hole formed in the other of the separate portions; and
- a rotatably lockable cap separate from the portions, a portion of said cap being fitted within said cavity, said cap being spaced apart and separate from the fastener.

16. The sealing arrangement for a post of claim 15 wherein said cavity includes a wall and wherein a locking tab extends from said wall.

17. The sealing arrangement for a post of claim 15 wherein said cap includes a tab-receiving slot.

18. The sealing arrangement for a post of claim 15 wherein said cap has a tool manipulating end and wherein said tool manipulating end includes an internal torque feature formed therein.

19. The sealing arrangement for a post of claim 15 wherein said cap has a tool manipulating end and wherein said tool manipulating end includes an external, multi-sided tool engagement surface.

* * * * *